(12) United States Patent
Toda

(10) Patent No.: US 12,430,293 B2
(45) Date of Patent: Sep. 30, 2025

(54) INFORMATION PROCESSING APPARATUS AND NON-TRANSITORY COMPUTER READABLE MEDIUM FOR SELECTING AND EXECUTING A WORKFLOW ON FILE BY DRAGGING AND DROPPING THE FILE ON A PARTICULAR FOLDER

(71) Applicant: FUJIFILM Business Innovation Corp., Tokyo (JP)

(72) Inventor: Yuki Toda, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 389 days.

(21) Appl. No.: 17/878,976

(22) Filed: Aug. 2, 2022

(65) Prior Publication Data
US 2023/0244638 A1 Aug. 3, 2023

(30) Foreign Application Priority Data
Feb. 2, 2022 (JP) .................. 2022-015120

(51) Int. Cl.
*G06F 16/16* (2019.01)
*G06F 3/04845* (2022.01)
*G06F 3/0486* (2013.01)

(52) U.S. Cl.
CPC ........ *G06F 16/168* (2019.01); *G06F 3/04845* (2013.01); *G06F 3/0486* (2013.01)

(58) Field of Classification Search
CPC .. G06F 3/04845; G06F 3/0486; G06F 16/168; G06Q 10/06
See application file for complete search history.

(56) References Cited

U.S. PATENT DOCUMENTS

| | | | |
|---|---|---|---|
| 7,650,575 B2 | 1/2010 | Cummins et al. | |
| 11,435,871 B1* | 9/2022 | Luvaas | G06F 3/04817 |
| 2002/0022900 A1* | 2/2002 | Honda | G06Q 10/06 700/99 |
| 2004/0189694 A1 | 9/2004 | Kurtz et al. | |
| 2004/0189695 A1 | 9/2004 | Kurtz et al. | |
| 2004/0189707 A1 | 9/2004 | Moore et al. | |
| 2004/0193600 A1 | 9/2004 | Kaasten et al. | |
| 2004/0207666 A1 | 10/2004 | Hally et al. | |
| 2004/0230599 A1 | 11/2004 | Moore et al. | |
| 2005/0080807 A1 | 4/2005 | Beilinson et al. | |

(Continued)

FOREIGN PATENT DOCUMENTS

| | | |
|---|---|---|
| JP | 2012-088912 A | 5/2012 |
| JP | 2012-185838 A | 9/2012 |
| JP | 2021-027539 A | 2/2021 |

OTHER PUBLICATIONS

Jun. 30, 2023 Extended Search Report issued in European Patent Application No. 22192300.6.

(Continued)

*Primary Examiner* — Daniel Samwel
(74) *Attorney, Agent, or Firm* — Oliff PLC

(57) ABSTRACT

An information processing apparatus includes a processor configured to: if a file serving as a process target is dragged to a folder where a workflow including multiple steps is set beforehand, display the steps included in the workflow set in the folder; and if the file is dropped onto a step of interest out of the displayed steps, perform a process of executing the workflow, starting with the step of interest.

15 Claims, 8 Drawing Sheets

(56) References Cited

U.S. PATENT DOCUMENTS

| | | | |
|---|---|---|---|
| 2005/0105135 A1* | 5/2005 | Takahashi | H04N 1/00464 358/1.14 |
| 2005/0188174 A1 | 8/2005 | Guzak et al. | |
| 2005/0246313 A1 | 11/2005 | Turski et al. | |
| 2005/0246331 A1 | 11/2005 | De Vorchik et al. | |
| 2005/0246643 A1 | 11/2005 | Gusmorino et al. | |
| 2005/0246648 A1 | 11/2005 | Miner et al. | |
| 2005/0251748 A1 | 11/2005 | Gusmorino et al. | |
| 2005/0283476 A1 | 12/2005 | Kaasten et al. | |
| 2006/0004692 A1 | 1/2006 | Kaasten et al. | |
| 2006/0036568 A1 | 2/2006 | Moore et al. | |
| 2006/0070007 A1 | 3/2006 | Cummins et al. | |
| 2006/0136833 A1* | 6/2006 | Dettinger | G06F 3/0486 715/845 |
| 2006/0200466 A1 | 9/2006 | Kaasten et al. | |
| 2007/0086038 A1* | 4/2007 | Matsuzaki | G06F 3/1285 358/1.15 |
| 2007/0088672 A1 | 4/2007 | Kaasten et al. | |
| 2007/0157100 A1* | 7/2007 | Wiggen | G06F 3/04817 715/837 |
| 2007/0168886 A1 | 7/2007 | Hally et al. | |
| 2008/0184069 A1* | 7/2008 | Mizuno | G06F 11/0781 714/2 |
| 2008/0222547 A1 | 9/2008 | Wong et al. | |
| 2008/0288531 A1 | 11/2008 | Turski et al. | |
| 2008/0307346 A1 | 12/2008 | Turski et al. | |
| 2009/0055428 A1 | 2/2009 | Turski et al. | |
| 2009/0113329 A1* | 4/2009 | Corona | G06F 8/34 715/769 |
| 2009/0327961 A1 | 12/2009 | De Vorchik et al. | |
| 2010/0070900 A1 | 3/2010 | Cummins et al. | |
| 2010/0205186 A1 | 8/2010 | Kaasten et al. | |
| 2010/0281390 A1 | 11/2010 | Kurtz et al. | |
| 2011/0083097 A1 | 4/2011 | Miner et al. | |
| 2012/0266099 A1 | 10/2012 | Hally et al. | |
| 2013/0263060 A1 | 10/2013 | Hally et al. | |
| 2013/0298075 A1 | 11/2013 | Miner et al. | |
| 2014/0040812 A1 | 2/2014 | Kurtz et al. | |
| 2015/0234893 A1 | 8/2015 | Kaasten et al. | |
| 2017/0019477 A1* | 1/2017 | Yamada | H04L 67/1001 |
| 2017/0090738 A1 | 3/2017 | Kurtz et al. | |
| 2017/0147296 A1* | 5/2017 | Kumar | G06Q 10/06 |
| 2019/0107977 A1 | 4/2019 | Yokoohji | |
| 2019/0173814 A1* | 6/2019 | McNeill | H04L 51/56 |
| 2021/0042024 A1 | 2/2021 | Tsumemitsu | |
| 2022/0207115 A1* | 6/2022 | van Manen | H04N 21/47205 |

OTHER PUBLICATIONS

"Finder—Drag, Hover, Auto-expand folder does not work in Big Sur", https://discussions.apple.com/thread/252833810, Jun. 4, 2021.

* cited by examiner ical Field

INFORMATION PROCESSING APPARATUS AND NON-TRANSITORY COMPUTER READABLE MEDIUM FOR SELECTING AND EXECUTING A WORKFLOW ON FILE BY DRAGGING AND DROPPING THE FILE ON A PARTICULAR FOLDER

CROSS-REFERENCE TO RELATED APPLICATIONS

This application is based on and claims priority under 35 USC 119 from Japanese Patent Application No. 2022-015120 filed Feb. 2, 2022.

BACKGROUND

(i) Technical Field

The present disclosure relates to an information processing apparatus and a non-transitory computer readable medium.

(ii) Related Art

Japanese Unexamined Patent Application Publication No. 2012-185838 discloses an electronic file system. When a selected object is dragged and dropped onto a target object, the electronic file system displays preview information that represents a type of action to be taken.

Japanese Unexamined Patent Application Publication No. 2021-027539 discloses an information processing apparatus. The information processing apparatus selects between a first mode and a second mode in response to an instruction from a user. The first mode is used to receive information on a selected workflow that processes target data before receiving the target data. The second mode is used to receive information on a selected workflow that processes target data after receiving the target data.

Japanese Unexamined Patent Application Publication No. 2012-088912 discloses a technique of displaying a customized screen. When documents are registered, an appropriate customized screen is set for each document according to a predetermined sorting condition of the registered documents. When a user opens a document from newly arrived documents, the customized screen is displayed.

According to a disclosed technique, a workflow is set beforehand in a folder and is executed when a file is dragged and dropped onto the folder. However, if the workflow set in the folder has multiple steps, execution of part of the workflow is not so easy. For example, the execution of the workflow starting with an intermediate step or the execution of the workflow after editing the workflow is not so easy. A new workflow is to be produced in order to execute the workflow starting with the intermediate step or execute the workflow after editing.

SUMMARY

Aspects of non-limiting embodiments of the present disclosure relate to providing an information processing apparatus, a non-transitory computer readable medium, and an information processing method enabled to execute a partial workflow in response to a simple operation in an easier way than when a workflow is newly produced.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: if a file serving as a process target is dragged to a folder where a workflow including multiple steps is set beforehand, display the steps included in the workflow set in the folder; and if the file is dropped onto a step of interest out of the displayed steps, perform a process of executing the workflow, starting with the step of interest.

BRIEF DESCRIPTION OF THE DRAWINGS

Exemplary embodiment of the present disclosure will be described in detail based on the following figures, wherein.

DETAILED DESCRIPTION

Figure 1:
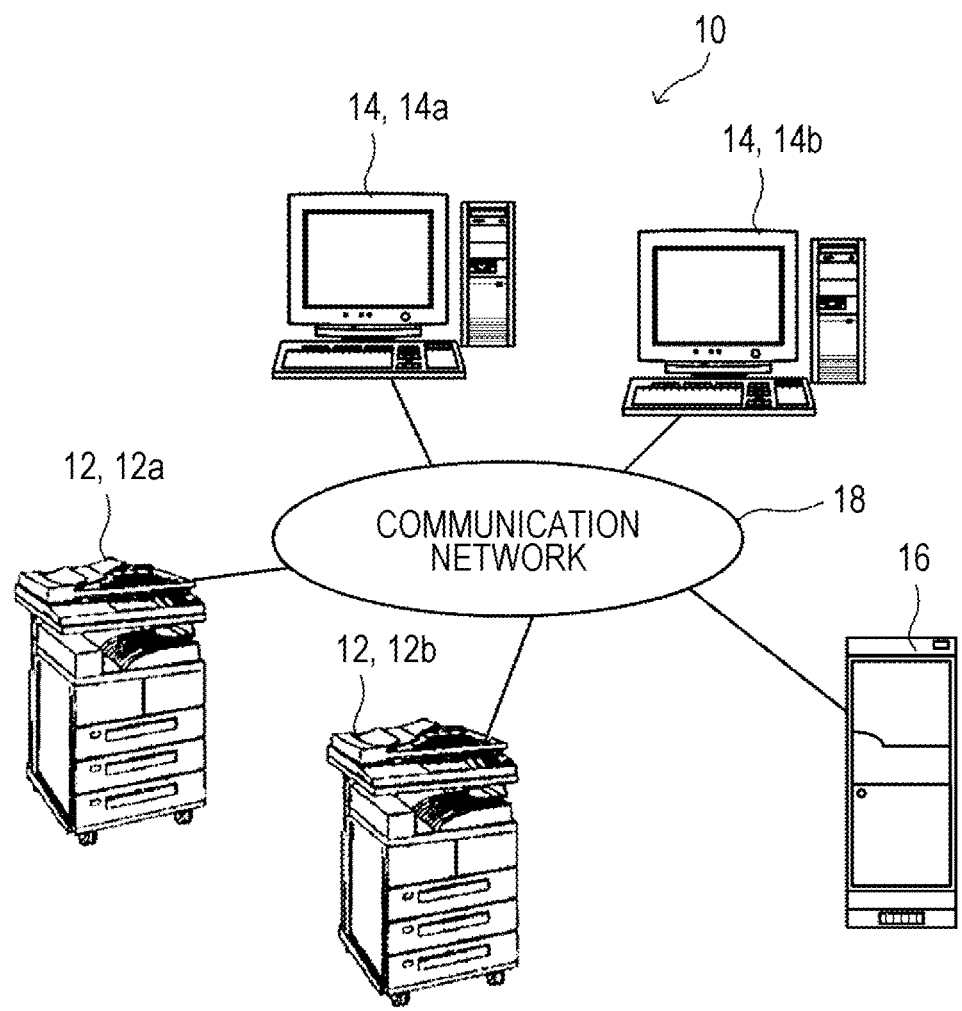
FIG. 1 illustrates a configuration of an information processing system of an exemplary embodiment.

Exemplary embodiment of the disclosure is described in detail below with reference to the drawings. For example, the exemplary embodiment is related to an information processing system 10 that includes multiple image forming apparatuses, multiple information processing terminals, and an information processing apparatus serving as a cloud server, interconnected to each other via a communication network. FIG. 1 illustrates the configuration of the information processing system 10 of the exemplary embodiment.

Referring to FIG. 1, the information processing system 10 of the exemplary embodiment includes image forming apparatuses 12*a*, 12*b*, . . . , information processing terminals 14*a*, 14*b*, . . . , and cloud server 16. If the image forming apparatuses 12*a*, 12*b*, . . . are not differentiated from each other, each image forming apparatus is collectively referred to as an image forming apparatus 12. If the information processing terminals 14*a*, 14*b*, . . . are not differentiated from each other, each information processing terminal is collectively referred to as an information processing terminal 14. In the discussion of the exemplary embodiment, the image forming apparatuses 12a, 12b, . . . , and the information processing terminals 14a, 14b, . . . are employed. The number of image forming apparatuses 12 may be one or more, and the number of information processing terminals 14 may be one or more.

The image forming apparatus 12, information processing terminal 14, and cloud server 16 are interconnected to each other via the communication network 18 including a local-area network (LAN), wide-area network (WAN), Internet, and/or intranet. The image forming apparatus 12, information processing terminal 14, and cloud server 16 may exchange a variety of data with each other via the communication network 18.

Figure 2:
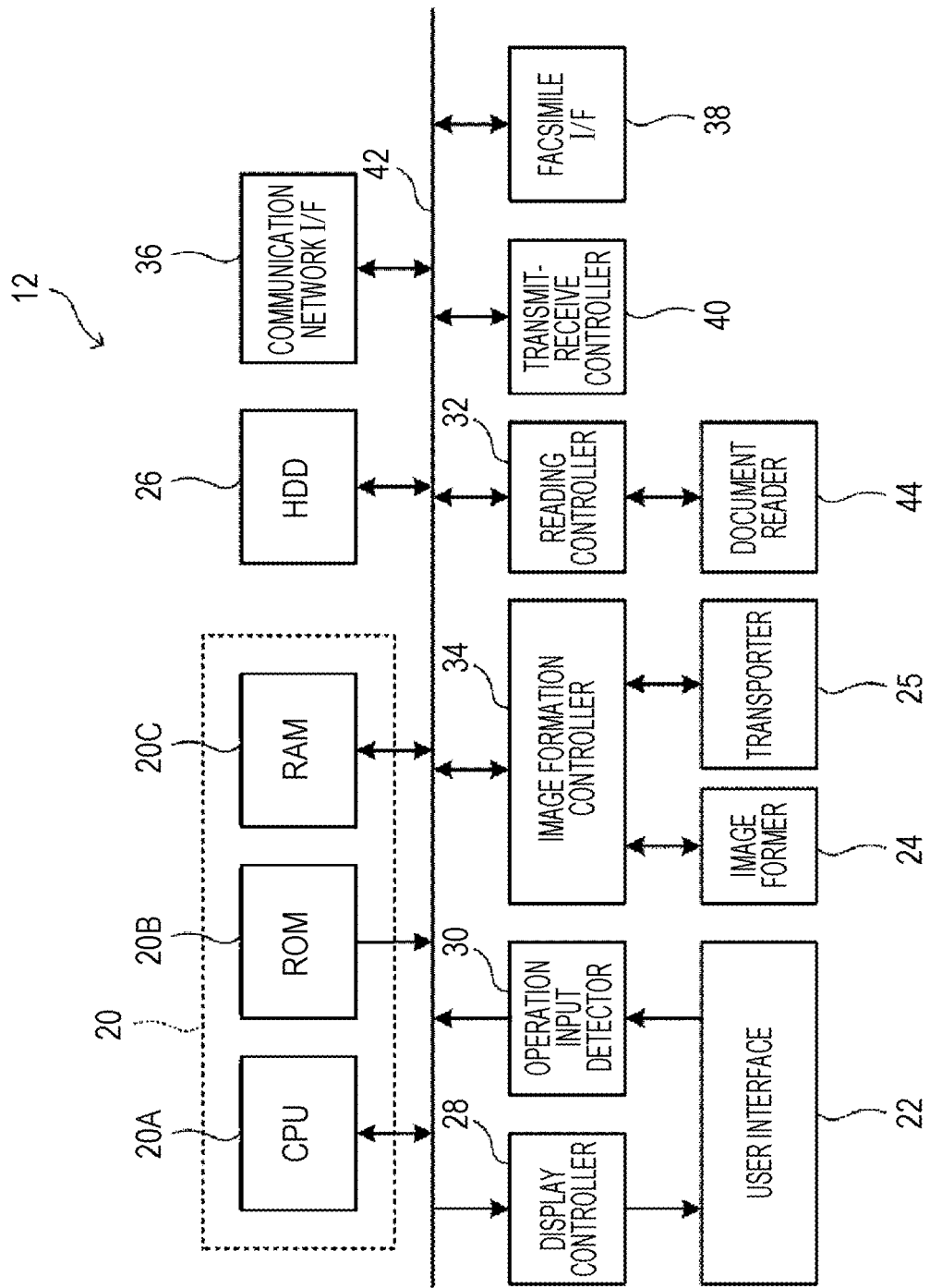
FIG. 2 is a block diagram illustrating an electrical configuration of a major portion of an image forming apparatus of the exemplary embodiment.

FIG. 2 is a block diagram illustrating an electrical configuration of a major portion of the image forming apparatus 12 of the exemplary embodiment.

Figure 3:
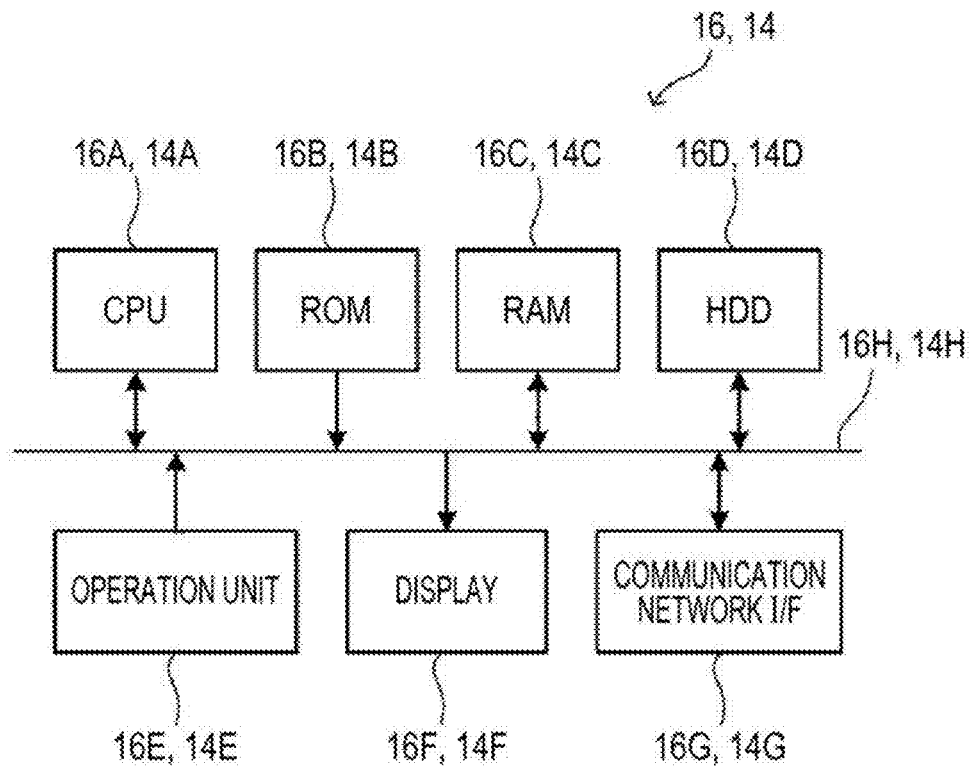
FIG. 3 is a block diagram illustrating an electrical configuration of a major portion of an information processing terminal and cloud server of the exemplary embodiment.

The image forming apparatus 12 of the exemplary embodiment includes a control unit 20 including a central processing unit (CPU) 20A, read-only memory (ROM) 20B, random-access memory (RAM) 20C as illustrated in FIG. 3. The CPU 20A controls the entire operation of the image forming apparatus 12. The RAM 20C is used as a work area when the CPU 20A executes a variety of programs. The ROM 20B stores beforehand a variety of control programs and a variety of parameters. Each section of the control unit 20 is electrically connected to elements of the image forming apparatus 12 via a system bus 42.

The image forming apparatus 12 of the exemplary embodiment includes a hard disk drive (HDD) 26 that stores a variety of data and a variety of application programs. The image forming apparatus 12 further includes a display controller 28 that is connected to a user interface 22 and controls displaying of a variety of operation screens onto the user interface 22. The image forming apparatus 12 further includes an operation input detector 30 that is connected to the user interface 22 and detects an operation instruction that is received via the user interface 22. In the image forming apparatus 12, the HDD 26, display controller 28, and operation input detector 30 are electrically connected to the system bus 42. The image forming apparatus 12 of the exemplary embodiment includes the HDD 26 as a memory. Alternatively, the image forming apparatus 12 may include a non-volatile memory, such as a flash memory.

The image forming apparatus 12 includes a reading controller 32 and image formation controller 34. The reading controller 32 controls a reading operation that a document reader 44 performs to optically read an image and also controls a document transport operation that a document transporter performs. The image formation controller 34 controls an image forming operation performed by an image former 24 and paper transportation that the transporter 25 performs to transport paper sheet to the image former 24. The image forming apparatus 12 further includes a communication network interface (I/F) 36 that is connected to the communication network 18 and transmits or receives communication data to or from an external apparatus, such as the cloud server 16 connected to the communication network 18. The image forming apparatus 12 further includes a facsimile I/F 38 that is connected to a telephone network (not illustrated) and transmits or receives facsimile data to or from a facsimile machine via the telephone network. The image forming apparatus 12 further includes a transmit-receive controller 40 that transmits or receives facsimile data via the facsimile I/F 38. In the image forming apparatus 12, the transmit-receive controller 40, reading controller 32, image formation controller 34, communication network I/F 36, facsimile I/F 38, and log collector 46 are electrically connected to the system bus 42.

In the configuration described above, the CPU 20A in the image forming apparatus 12 of the exemplary embodiment accesses each of the RAM 20C, ROM 20B, and HDD 26. Using the display controller 28, the CPU 20A in the image forming apparatus 12 controls displaying of an operation screen and information including a variety of messages on a display 22A of the user interface 22. Using the reading controller 32, the CPU 20A in the image forming apparatus 12 controls the operation of the document reader 44 and document transporter. Using the image formation controller 34, the CPU 20A in the image forming apparatus 12 controls the operation of the image former 24 and transporter 25 and transmission and reception of communication data via the communication network I/F 36. Using the transmit-receive controller 40, the CPU 20A in the image forming apparatus 12 controls the transmission and reception of facsimile data via the facsimile I/F 38. The CPU 20A in the image forming apparatus 12 recognizes contents of operation of the user interface 22 in accordance with operation information detected by the operation input detector 30 and performs various control operations responsive to the contents of operation.

The electrical configuration of a major portion of the information processing terminal 14 and cloud server 16 of the exemplary embodiment is described below. FIG. 3 is a block diagram illustrating the electrical configuration of the major portion of the information processing terminal 14 and cloud server 16. Each of the information processing terminal 14 and cloud server 16 has a typical computer configuration. Only the cloud server 16 is representatively described herein.

As illustrated in FIG. 3, the cloud server 16 of the exemplary embodiment includes a CPU 16A, ROM 16B, RAM 16C, HDD 16D, operation unit 16E, display 16F, and communication network interface (I/F) 16G. The CPU 16A controls the whole operation of the cloud server 16. The ROM 16B pre-stores a variety of control programs and a variety of parameters. The RAM 16C is used as a work area when the CPU 16A performs the variety of programs. The HDD 16D stores a variety of data and a variety of application programs. The operation unit 16E includes a keyboard and/or mouse and is used to enter a variety of information. The display 16F displays a variety of information. The communication network I/F 16G is connected to the communication network 18 and transmits and receivers a variety of data to and from another apparatus connected to the communication network 18. The elements of the cloud server 16 are electrically connected to a system bus 16H. The cloud server 16 of the exemplary embodiment includes the HDD 16D as the memory thereof. Alternatively, the cloud server 16 may include a non-volatile memory, such as a flash memory.

In the configuration described above, the CPU 16A in the cloud server 16 of the exemplary embodiment accesses each of the ROM 16B, RAM 16C, and HDD 16D, acquires a variety of data via the operation unit 16E, and displays a variety of information on the display 16F. The CPU 16A in the cloud server 16 controls the transmission and reception of the communication data via the communication network I/F 16G.

According to the exemplary embodiment, in the information processing system 10 thus configured, cloud service provided by the cloud server 16 may be used via the information processing terminal 14. According to the exemplary embodiment, the cloud server 16 provides, as a cloud service, a file upload and sharing service that is used to upload and share a file.

The file upload and sharing service to share a file with another apparatus is enjoyed by uploading the file onto the cloud server 16. The file upload and sharing service has a function that allows a workflow including multiple steps to be registered and executes the registered workflow. The workflow includes steps, such as application and approval, and is used to perform, for example, an operation to transmit information, such as a form, to the information processing terminal 14 of a person in charge of each step. In the discussion that follows, each step of the workflow is referred to as a task.

The execution method of a registered workflow in the file upload and sharing service is described below. In the following discussion, an operation of overlapping a mouse pointer onto a target is referred to a mouseover.

Accessing the cloud server 16 using the information processing terminal 14 allows a predetermined operation screen in the file upload and sharing service to be received from the cloud server 16 and the operation screen to be displayed on a display 14F of the information processing terminal 14.

Figure 4:
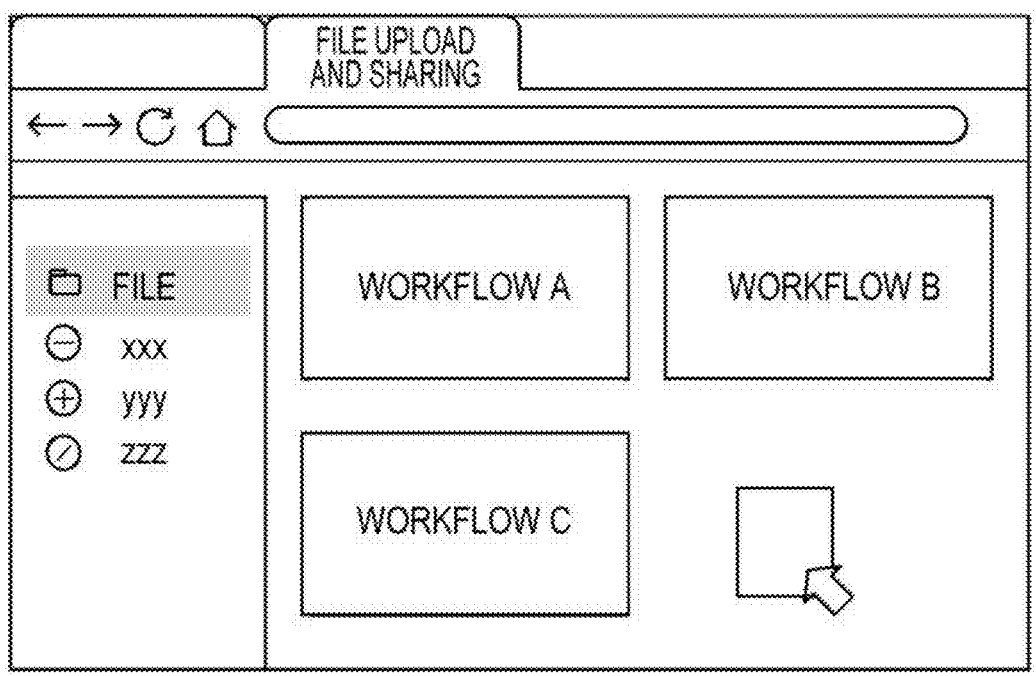
FIG. 4 illustrates an example of displayed workflows that are set beforehand in a currently displayed folder.
Figure 5:
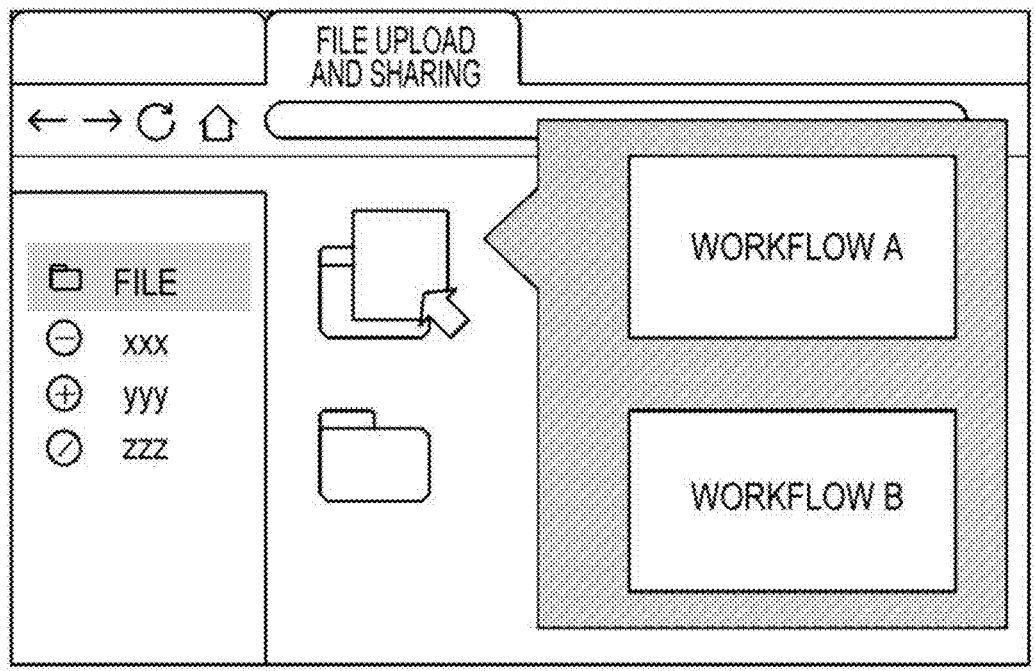
FIG. 5 illustrates an example of displayed workflows that are set beforehand in a folder at a mouseover point.

When a user drags a file from another window to the operation screen, the workflow predetermined in a currently displayed folder is displayed as illustrated in FIG. 4. Alternatively, the workflow preset in a moused over folder is displayed as illustrated in FIG. 5. A blank point on the screen, if moused over, is regarded as uploading to the currently displayed folder and a workflow set in the currently displayed folder is displayed on the entire screen. Alternatively, if a specific folder is moused over as illustrated in FIG. 5, a workflow set in the specific folder may be popped up or may be displayed on the entire screen.

Figure 6:
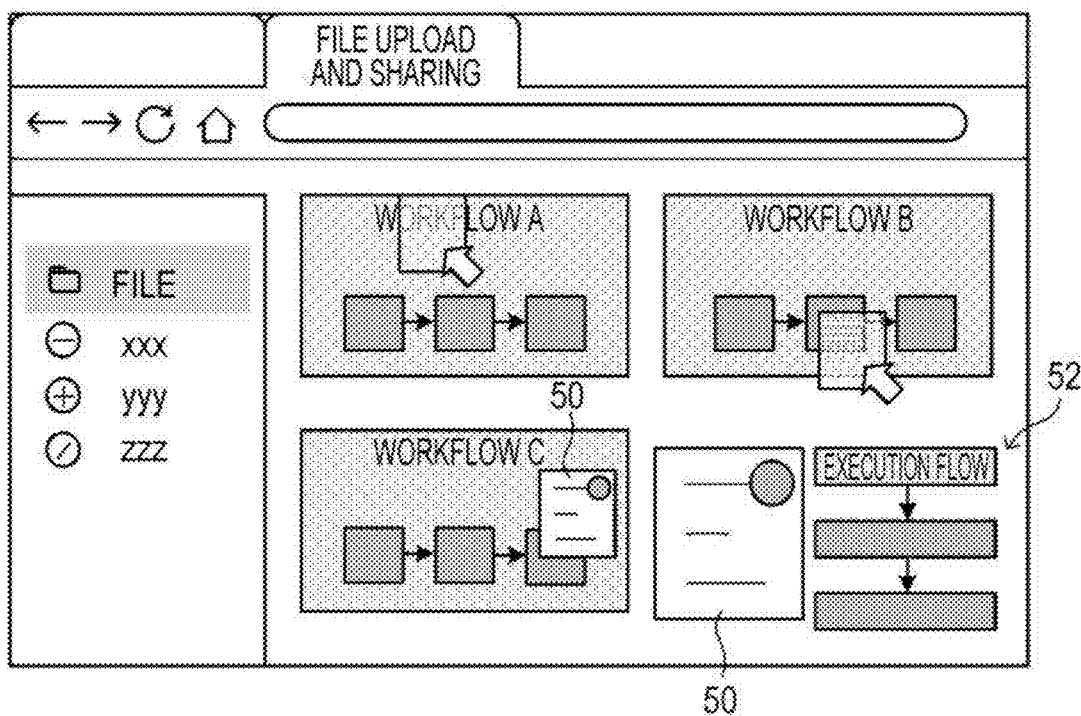
FIG. 6 illustrates an example of each displayed task set in each workflow.

When workflows are displayed as illustrated in FIG. 6, tasks set in each workflow may be displayed. Referring to FIG. 6, three tasks are set in each of the three workflows A through C.

By dropping the file in a region excluding the tasks of the workflow, or in any of the tasks, the user executes the workflow. When the file is dropped in a task-free region as illustrated in the workflow A in FIG. 6, the workflow is executed starting with the first task thereof in accordance with the exemplary embodiment. When the file is dropped in a task in the workflow as illustrated in the workflow B in FIG. 6, the workflow is executed starting with the task where the file is dropped in the middle of the workflow. In this way, a partial workflow is executed in response to a simple operation in a manner free from returning to the setting screen of the workflow and starting over after interrupting the uploading and movement of the file.

During the mouseover, a thumbnail image 50 of result prediction after the execution of the task is displayed as illustrated in FIG. 6. The result prediction thumbnail image 50 may be displayed behind the tasks or in a dedicated region. A list of workflows 52 indicating contents of a process to be executed may be separately displayed.

According to the exemplary embodiment, operations of editing and executing the workflow may be performed using a trajectory along which the file is dragged.

Figure 7:
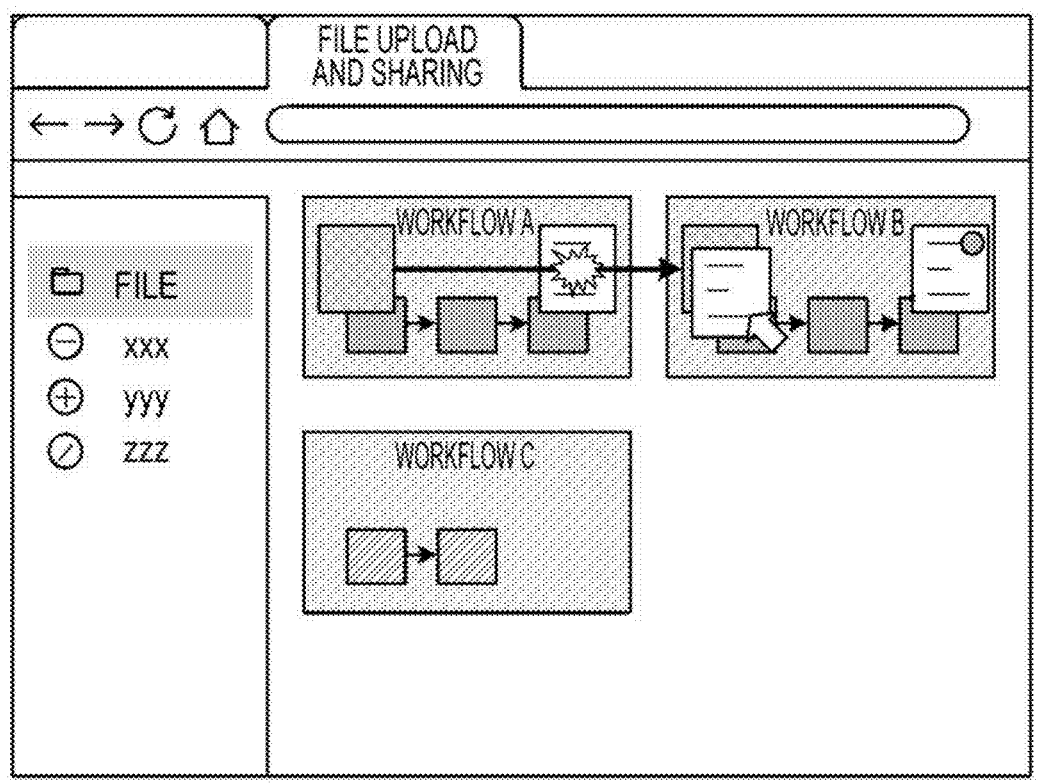
FIG. 7 illustrates workflows that are consecutively executed.

If workflows are consecutively executable, for example, if two document editing workflows are present, the file is dragged and pulled by way of the thumbnail image 50 displayed in the result prediction and dropped onto a next workflow. In this way, multiple workflows are specified for execution at any sequence. For example, as illustrated in FIG. 7, the file is dragged to mouse over the region of the workflow A such that the thumbnail image 50 of the result prediction responsive to the execution of the workflow A is displayed. The thumbnail image 50 may be pulled by performing a predetermined operation, such as by dragging the file over the thumbnail image 50, by placing the mouse over the thumbnail image 50 for the elapse of a predetermined time period, or operating a control key or the like on the thumbnail image 50. By placing the mouse over the workflow B with the thumbnail image 50 pulled, the thumbnail image 50 of the result prediction responsive to the execution of the workflow B is displayed after performing the workflow A, and then, by dropping the file, two workflows are consecutively performed.

In order to execute a task in the middle of the workflow A, the user drags the file to the target task and displays the thumbnail image 50 responsive to the execution of the task in the middle of the workflow A. Also, in order to execute a task in the middle of the workflow B the user wants to execute in succession, the user may simply drag the file to mouse over the task in the middle and then drop the file.

Consecutive execution may be difficult, or execution of one file may be difficult if the number of files to be dropped is plural. In such a case, drop destinations may be consecutively invalidated, an error indicator may be displayed, or specifying a file may be followed by editing. For example, if there is a step that is difficult to execute, a display form indicative of execution difficulty may be displayed as illustrated in a workflow C in FIG. 7. Referring to the workflow C in FIG. 7, the display form indicative of execution difficulty may be indicated by hatching. The display form indicative of execution difficulty may be indicated by a grayout area or by flashing.

Figure 8:
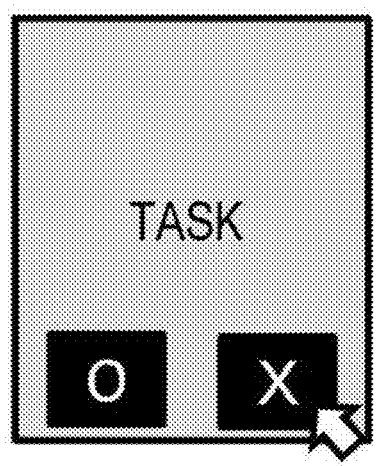
FIG. 8 illustrates an example of a displayed icon providing an instruction in a task icon.

When workflows or tasks are consecutively executed, mouseover on a task for a predetermined time period may display an icon that is used to select whether to execute the task. For example, FIG. 8 illustrates in a task icon an icon to execute the task (symbol "○" in FIG. 8) and an icon to cancel the task (symbol "x" in FIG. 8). Referring to FIG. 8, mousing over the symbol ○ adds an action and mousing over the symbol x cancels the operation.

Figure 9:
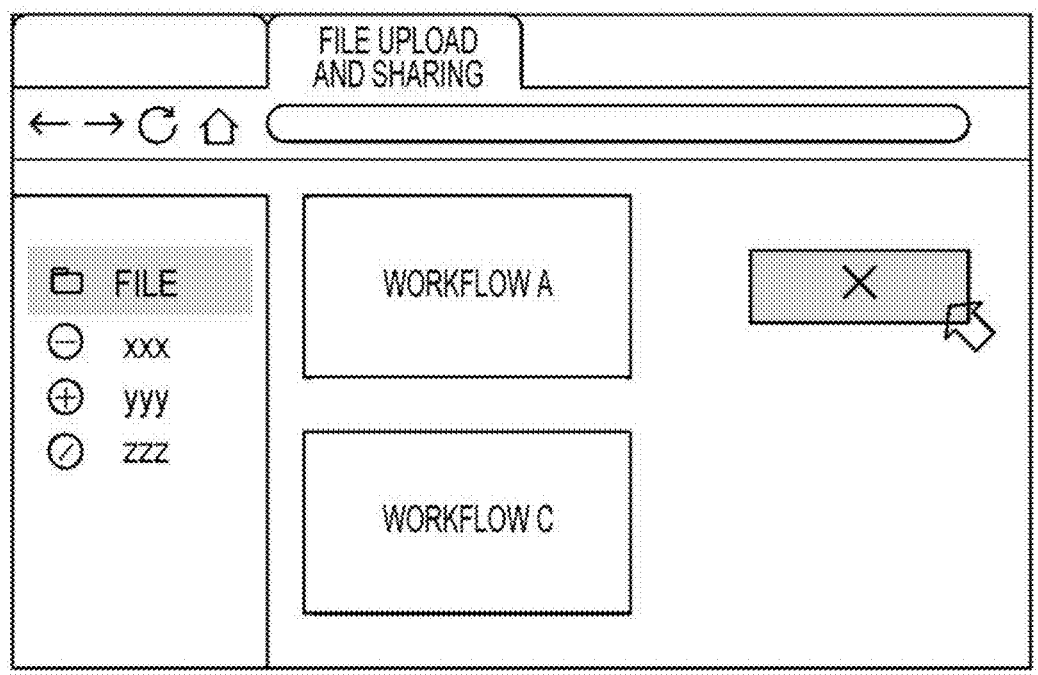
FIG. 9 illustrates a cancel region that is placed on a screen.
Figure 10:
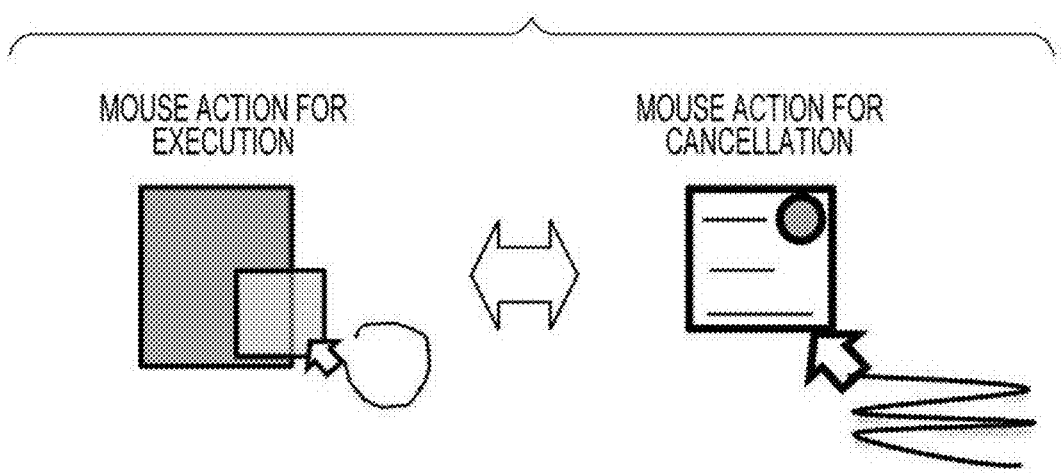
FIG. 10 illustrates an example where conformation and canceling are performed in response to a mouse action.

Referring to FIG. 9, a cancel region, such as the x icon, is arranged such that the closest operation is cancelable. Alternatively, referring to FIG. 10, confirmation or cancellation may be instructed using a mouse action in order to confirm a nearby item or cancel the closest operation. Referring to FIG. 10, the confirmation is instructed by drawing a trajectory of a circle near the task icon, and the closest operation may be canceled by drawing a zigzag line.

Figure 11:
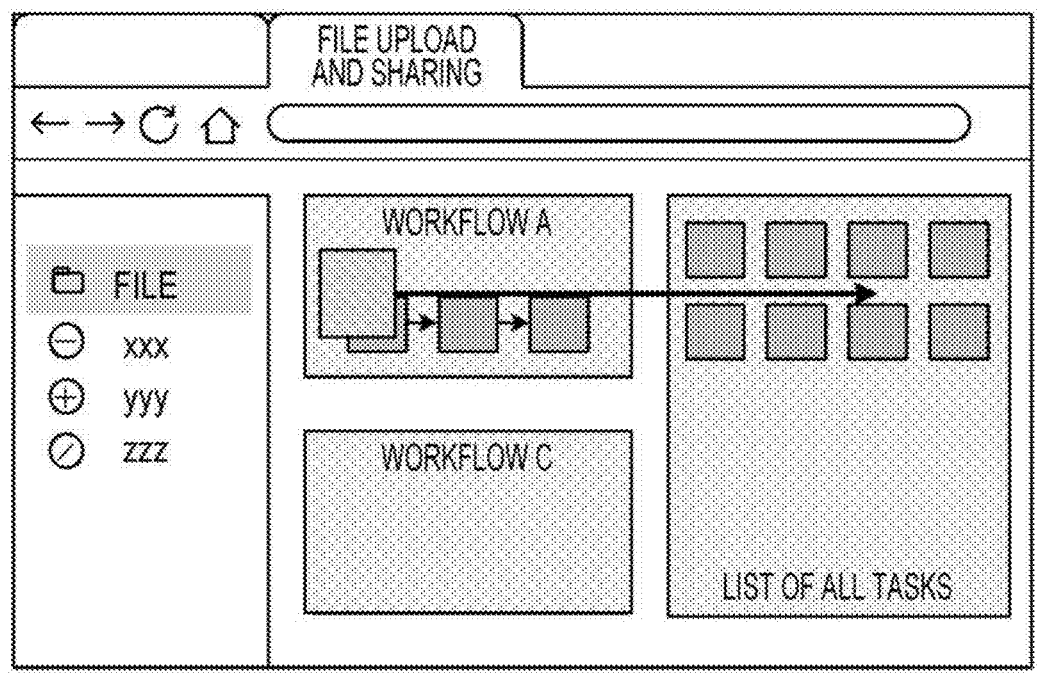
FIG. 11 illustrates an example of a workflow that is set by displaying a list of all tasks.

Referring to FIG. 11, a list of all tasks that are registerable as steps of a workflow may be displayed and a workflow obtained by freely combining tasks may be set on the spot.

Figure 12:
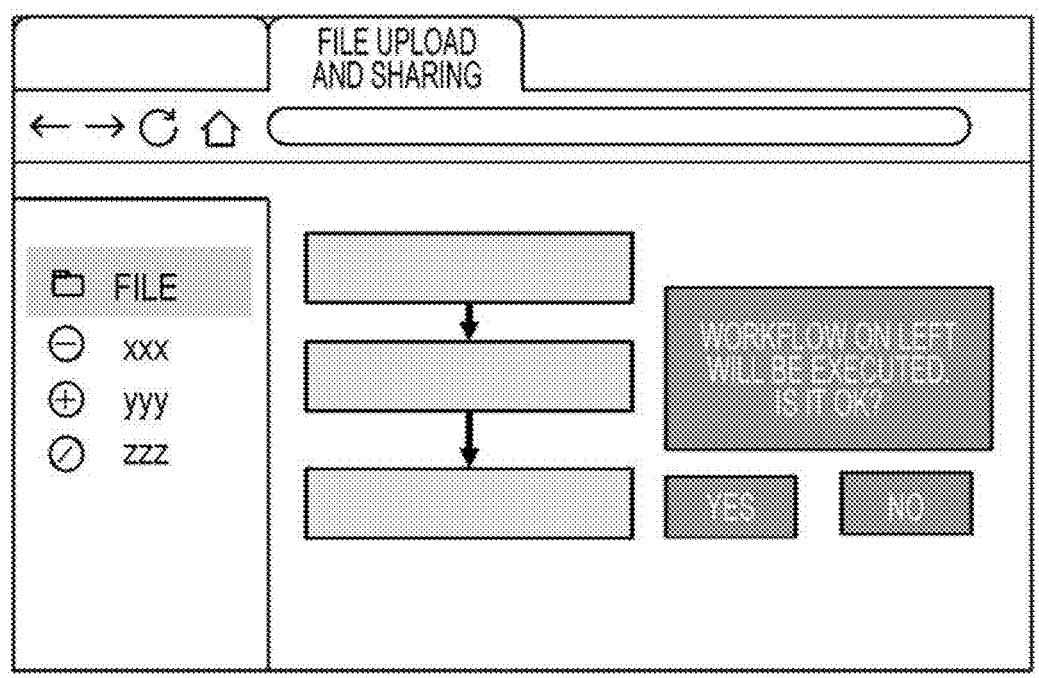
FIG. 12 illustrates an example of a displayed verification screen of the workflow.

When the file is dropped, a verification screen of the workflows selected heretofore may be displayed as illustrated in FIG. 12. If only one workflow is used, that workflow is immediately performed without displaying the verification screen. If multiple workflows are used, the verification screen may be displayed. Alternatively, the verification screen may be displayed regardless of the number of workflows. Alternatively, a determination as to whether to display the verification screen may be switchable depending on user setting. Referring to FIG. 12, the verification screen is displayed to display process contents of the selected workflow and to confirm whether to execute the workflow.

In the following specific example, a single workflow is executed starting with the middle thereof. The workflow includes the following steps:

Step 1 A document is uploaded in a "contract" folder.
Step 2 "An approval request is transmitted to a supervisor."
Step 3 "If the supervisor has approved, a file is transferred to digital signature service."
Step 4 "Digitally signed file is transferred to a client folder."

According to the exemplary embodiment, if a procedure of approval stamping has been executed offline, the workflow starts with step 4.

In the following discussion, different workflows are consecutively performed. In the same procedure described above, the workflows include the workflow A and the workflow B and each workflow may include the following steps.

Workflow A
Step 1 A document is uploaded in a "contract" folder.
Step 2 "An approval request is transmitted to a supervisor."

Workflow B
Step 1 A document is uploaded in a "contract" folder.
Step 2 "File is transferred to digital signature service."
Step 3 "Digitally signed file is transferred to client folder."

According to the exemplary embodiment, the user may want to make the step of the approval request only or the step of digital signature only, or the steps of the approval request and digital signature. The steps may be freely combined in this way.

Figure 13:
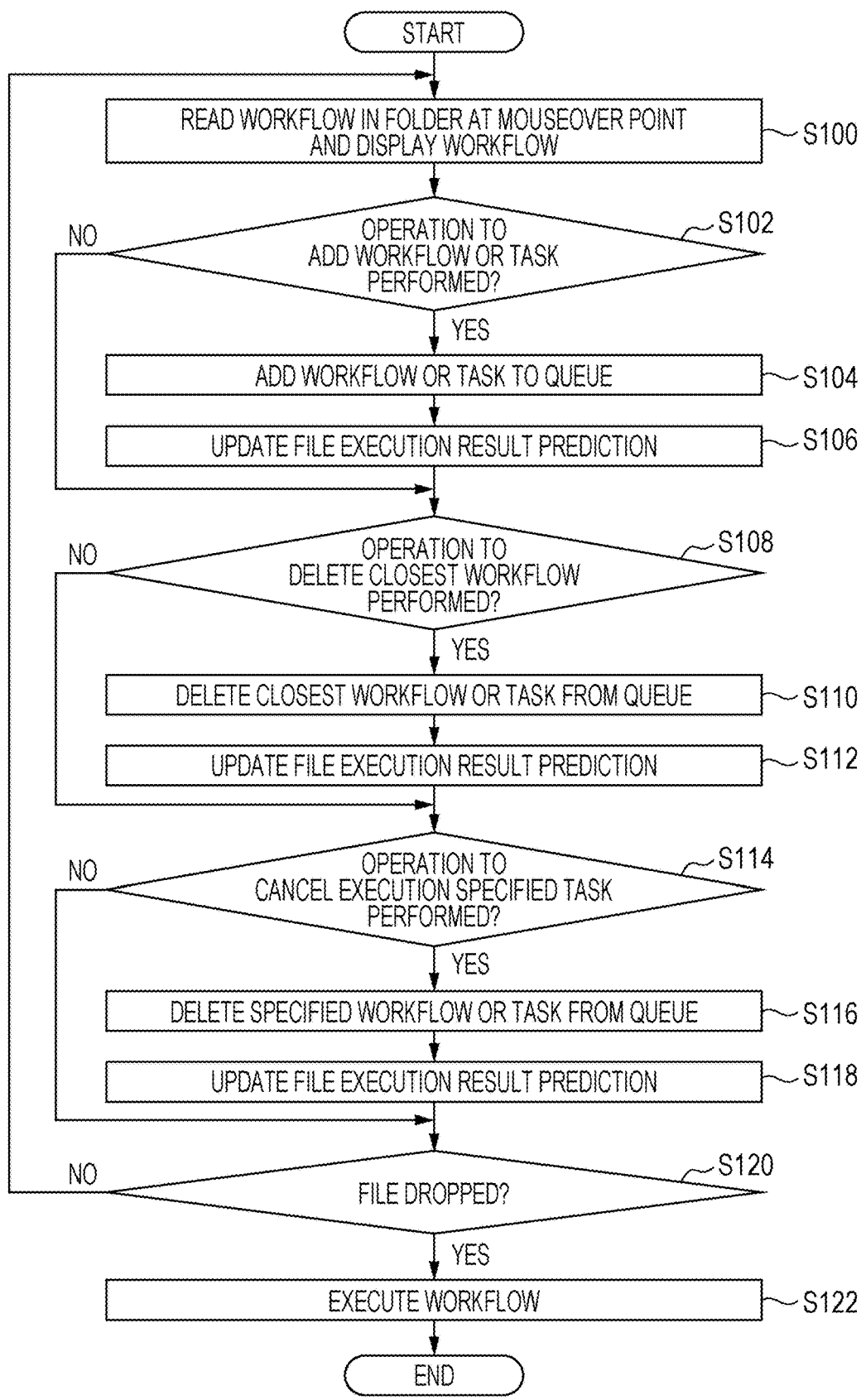
FIG. 13 is a flowchart illustrating an example of a process flow that is executed by the information processing system of the exemplary embodiment.

A specific process of the information processing system 10 of the exemplary embodiment is described below. FIG. 13 is a flowchart illustrating an example of a process flow that is executed by the information processing system 10 of the exemplary embodiment. The process illustrated in FIG. 13 is performed by a web application of the cloud server 16. For example, the process illustrated in FIG. 13 starts when the information processing terminal 14 notifies the cloud server 16 that a file is dragged from a different window to the operation screen to mouse over a folder.

In step S100, the CPU 16A reads a workflow from a folder at a mouseover point, displays the workflow and then proceeds to step S102. Specifically, the CPU 16A acquires operation information on the information processing terminal 14, and determines whether the workflow set beforehand in the folder at the mouseover point is present on a database. If the workflow is present, the CPU 16A transmits the workflow to the information processing terminal 14. The CPU 16A thus displays the workflow on the display 14F of the information processing terminal 14. For example, the CPU 16A displays the name of the workflow set by the user on each workflow region. A button used to display all tasks specified in the workflow may be displayed. Each task set in the workflow may be displayed in the workflow region.

In step S102, the CPU 16A determines whether an operation to add a workflow or a task has been performed. The determination may be performed by acquiring the operation information on an operation unit 14E from the information processing terminal 14 and by determining that an mouseover operation has been performed with the file dragged to mouse over the region of the workflow or each task to be executed. If the yes path is followed in step S102, the CPU 16A proceeds to step S104; otherwise, the CPU 16A proceeds to step S108.

In step S104, the CPU 16A adds a target workflow or a target task to a queue and proceeds to step S106. The queue is a mechanism that is used to specify the execution or cancellation of the task. The addition or deletion of a workflow or a task to or from the queue and finally, the workflows or tasks remaining in the queue are executed in sequence from the beginning thereof.

In step S106, the CPU 16A updates file execution result prediction and proceeds to step S108. Specifically, the CPU 16A updates the thumbnail image 50 of the result prediction in response to the execution of the workflow or task added to the queue, transmits the updated thumbnail image 50 to the information processing terminal 14, and displays the updated thumbnail image 50 on the display 14F of the information processing terminal 14.

In step S108, the CPU 16A determines whether an operation to delete the closest workflow has been performed. For example, the determination may be performed by acquiring the operation information on the operation unit 14E from the information processing terminal 14 and determining whether a cancel operation has been performed using the cancel icon (the symbol x icon in FIGS. 8 and 9) or in response to a mouse action. If the yes path is followed in step S108, the CPU 16A proceeds to step S110; otherwise, the CPU 16A proceeds to step S114.

In step S110, the CPU 16A deletes the closest workflow or task from the queue and proceeds to step S112. Specifically, the CPU 16A deletes the closest workflow or task as the target of the cancel operation from the queue.

In step S112, the CPU 16A updates the execution result prediction of the file and proceeds to step S114. Specifically, the CPU 16A generates the thumbnail image 50 of the execution result prediction in response to the deletion of the target workflow or task from the queue, transmits the generated thumbnail image 50 to the information processing terminal 14, and displays the generated thumbnail image 50 on the display 14F of the information processing terminal 14.

In step S114, the CPU 16A determines whether an operation to cancel the execution specified task has been performed. Like the determination operation in step S108, the determination may be performed by determining whether the cancel operation has been performed using the cancel icon (the symbol x icon in FIGS. 8 and 9) or in response to a mouse action. If the yes path is followed in step S114, the CPU 16A proceeds to step S116; otherwise, the CPU 16A proceeds to step S120.

In step S116, the CPU 16A deletes the specified workflow or task and proceeds to step S118. Specifically, the CPU 16A deletes from the queue the specified workflow or task responsive to the cancel operation.

In step S118, the CPU 16A updates the execution result prediction of the file and proceeds to step S120. The CPU 16A generates the thumbnail image 50 of the execution result prediction responsive to the deletion of the target workload and task from the queue, transmits the generated thumbnail image 50 to the information processing terminal 14, and displays the generated thumbnail image 50 on the display 14F of the information processing terminal 14.

In step S120, the CPU 16A determines whether the file has been dropped. The determination may be performed by acquiring the operation information from the information processing terminal 14 and then determines whether the file has been dropped. If the no path is followed in step S120, the CPU 16A returns to step S100 to repeat step S100 and subsequent steps; otherwise, the CPU 16A proceeds to step S122.

In step S122, the CPU 16A executes the workflow added to the queue and ends the process.

In the exemplary embodiment, the cloud server 16 performs the process in FIG. 13. Alternatively, an application that uses the file upload and sharing service may be installed on the information processing terminal 14 including a terminal apparatus and the information processing terminal 14 may perform the process in FIG. 13. The process in FIG. 13 performed by the information processing terminal 14 is described herein. In this case, the information processing terminal 14 functions as an information processing apparatus.

In step S100, a CPU 14A in the information processing terminal 14 acquires a workflow from the cloud server 16 by requesting the cloud server 16 to read the workflow set in a folder at a mouseover point, and displays the workflow on the display 14F.

In step S102, the CPU 14A determines whether an operation to add a workflow or task has been performed. For example, the determination may be performed by determining whether the operation of the operation unit 14E has dragged the file to mouse over the region of the workflow or task to be executed. If the yes path is followed in step S102, the CPU 14A proceeds to step S104; otherwise, the CPU 14A proceeds to step S108.

In step S104, the CPU 14A requests the cloud server 16 to add a target workflow or task to a queue and then proceeds to step S106. In this way, the cloud server 16 adds the target workflow or task to the queue.

In step S106, the CPU 14A acquires from the cloud server 16 the thumbnail image 50 with the file execution result prediction updated, displays the updated thumbnail image 50 on the display 14F, and proceeds to step S108. The cloud server 16 generates the thumbnail image 50 having the file execution result prediction updated in response to the execution of the workflow or task in the queue. The cloud server 16 then transmits the generated thumbnail image 50 to the information processing terminal 14.

In step S108, the CPU 14A determines whether the operation to delete the closest workflow has been performed. For example, the determination may be performed by determining whether the operation unit 14E has performed the cancel operation using the cancel icon (the symbol x icon in FIGS. 8 and 9) or in response to a mouse action. If the yes path is followed in step S108, the CPU 14A proceeds to step S110; otherwise, the CPU 14A proceeds to step S114.

In step S110, the CPU 14A requests the cloud server 16 to delete the closest workflow or task from the queue and then proceeds to step S112. The cloud server 16 deletes the closest workflow or task from the queue in response to the cancel operation.

In step S112, the CPU 14A acquires from the cloud server 16 the thumbnail image 50 with the file execution result prediction updated, displays the updated thumbnail image 50 on the display 14F, and proceeds to step S114. The cloud server 16 generates the thumbnail image 50 with the file execution result prediction updated in response to the execution of the workflow or task in the queue. The cloud server 16 then transmits the generated thumbnail image 50 to the information processing terminal 14.

In step S114, the CPU 14A determines whether an operation to cancel the execution specified task has been performed. Like the determination operation in step S108, the determination may be performed by determining whether the cancel operation has been performed using the cancel icon (the symbol x icon in FIGS. 8 and 9) or in response to a mouse action. If the yes path is followed in step S114, the CPU 14A proceeds to step S116; otherwise, the CPU 14A proceeds to step S120.

In step S116, the CPU 14A requests the cloud server 16 to delete the specified workflow or task and proceeds to step S118. Specifically, the cloud server 16 deletes from the queue the specified workflow or task in response to the cancel operation.

In step S118, the CPU 14A acquires from the cloud server 16 the thumbnail image 50 with the file execution result prediction updated, displays the updated thumbnail image 50 on the display 14F, and proceeds to step S120. The cloud server 16 generates the thumbnail image 50 with the file execution result prediction updated in response to the execution of the workflow or task in the queue. The cloud server 16 then transmits the generated thumbnail image 50 to the information processing terminal 14.

In step S120, the CPU 14A determines whether the file has been dropped. For example, the determination may be performed by determining whether the operation unit 14E has dropped the file. If the no path is followed in step S120, the CPU 14A returns to step S100 to repeat step S100 and subsequent steps; otherwise, the CPU 14A proceeds to step S122.

In step S122, the CPU 14A executes the workflow by requesting the cloud server 16 to execute the workflow added to the queue and thus ends the process.

As described above, the cloud server 16 or the information processing terminal 14 is an information processing apparatus. Alternatively, the whole information processing system 10 may be an information processing apparatus.

The process performed by the information processing system 10 of the exemplary embodiment may be executed using software, hardware, or a combination thereof. The process performed by the information processing system 10 may be implemented by a computer program that is distributed in a recorded form on a recording medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
if a file serving as a process target is dragged to a folder where a workflow including a plurality of steps is set beforehand, display the steps included in the workflow set in the folder; and if the file is dropped onto a step of interest out of the steps displayed, perform a process of executing the workflow, starting with the step of interest, wherein the processor is configured to, if the file is dragged to the step of interest, further display a thumbnail image showing execution result prediction of execution of the workflow starting with the step of interest on the dragged file.

2. The information processing apparatus according to claim 1, wherein the processor is configured to, if the file is dragged to the step of interest, further display process contents of each of the steps of the workflow, starting with the step of interest.

3. The information processing apparatus according to claim 1, wherein the processor is configured to, if the file is dragged over the displayed thumbnail image showing the execution result prediction and dropped onto a second workflow, execute the second workflow in succession to the workflow of the execution result prediction.

4. The information processing apparatus according to claim 2, wherein the processor is configured to, if the file is dragged over the displayed thumbnail image showing the execution result prediction and dropped onto a second workflow, execute the second workflow in succession to the workflow of the execution result prediction.

5. The information processing apparatus according to claim 1, wherein the processor is configured to, if an infeasible step is present, display the infeasible step in a display form indicative of infeasibility.

6. The information processing apparatus according to claim 1, wherein the processor is configured to select, out of the displayed steps, a step to be executed, by using a trajectory along which the file has been dragged.

7. The information processing apparatus according to claim 6, wherein the processor is configured to select, as an execution target out of the displayed steps, a step that has undergone a predetermined operation.

8. The information processing apparatus according to claim 7, wherein the predetermined operation is to position the file on the step of interest until a predetermined time duration elapses with the file in a dragged state.

9. An information processing apparatus comprising:
a processor configured to:
display both a folder where a workflow including a plurality of steps is set beforehand and the steps of the workflow set in the folder;
edit the displayed workflow using a trajectory along which a thumbnail image has been dragged, the thumbnail image showing execution result prediction of execution of a step on a file serving as a process target and being displayed when the file is dragged to the step among the steps displayed; and
if the file is dropped, perform a process that executes the edited workflow.

10. The information processing apparatus according to claim 9, wherein the processor is configured to further display a step that is enabled to be registered as a step of the workflow.

11. The information processing apparatus according to claim 9, wherein the processor is configured to, if an infeasible step is present, display the infeasible step in a display form indicative of infeasibility.

12. The information processing apparatus according to claim 9, wherein the processor is configured to select, out of the displayed steps, a step to be executed, by using the trajectory along which the file has been dragged.

13. The information processing apparatus according to claim 12, wherein the processor is configured to select, as an execution target out of the displayed steps, a step that has undergone a predetermined operation.

14. The information processing apparatus according to claim 13, wherein the predetermined operation is to position the file on a step of interest until a predetermined time duration elapses with the file in a dragged state.

15. A non-transitory computer readable medium storing a program causing a computer to execute a process, the process comprising:
if a file serving as a process target is dragged to a folder where a workflow including a plurality of steps is set beforehand, displaying the steps included in the workflow set in the folder; and
if the file is dropped onto a step of interest out of the displayed steps, performing a process of executing the workflow, starting with the step of interest,
wherein the process further comprises, if the file is dragged to the step of interest, further displaying a thumbnail image showing execution result prediction of execution of the workflow starting with the step of interest on the dragged file.

\* \* \* \* \*